United States Patent [19]

Caye et al.

[11] Patent Number: 4,589,707

[45] Date of Patent: May 20, 1986

[54] KINETIC WHEEL ARRANGEMENT INCORPORATING MAGNETIC BEARINGS, PARTICULARLY INTENDED TO SERVE AS ENERGY ACCUMULATOR

[75] Inventors: Paul D. Caye, Epone; Patrice C. Jamain, Maule; Bernard G. Weisser, Limay, all of France

[73] Assignee: Societe Nationale Industrielle Aerospatiale, Paris, France

[21] Appl. No.: 695,756

[22] Filed: Jan. 29, 1985

Related U.S. Application Data

[63] Continuation of Ser. No. 515,149, Jul. 19, 1983, abandoned.

[30] Foreign Application Priority Data

Aug. 19, 1982 [FR] France .............................. 82 14340

[51] Int. Cl.⁴ .............................................. F16C 39/06
[52] U.S. Cl. .......................................... 308/10; 310/74
[58] Field of Search ...................... 310/75, 74; 308/10

[56] References Cited

U.S. PATENT DOCUMENTS

| | | | |
|---|---|---|---|
| 3,143,704 | 8/1964 | Wright | 308/10 X |
| 3,683,216 | 8/1972 | Post | 310/74 X |
| 3,888,553 | 6/1976 | Wehde | 308/10 |

Primary Examiner—Donovan F. Duggan
Attorney, Agent, or Firm—Fisher, Christen & Sabol

[57] ABSTRACT

The invention relates to a kinetic wheel arrangement comprising a stator and a rotor, magnetic bearings formed by cooperating parts respectively connected to the stator and to the rotor in order magnetically to suspend the rotor with respect to the stator, mechanical bearings to allow the stator to support the rotor when the latter is not suspended magnetically, an inertia flywheel constituting a part of the rotor, and means for monitoring, along the axis of rotation Z—Z defined by the stator, the axial position of the rotor with respect to the stator. According to the invention, this arrangement is characterized in that it comprises a magnetic system for giving the radial rigidity of the rotor with respect to the stator, in at least one fixed radial direction, a value different from that presented by said radial rigidity in the other radial directions. The invention is more particularly applicable to the kinetic storage of energy.

10 Claims, 12 Drawing Figures

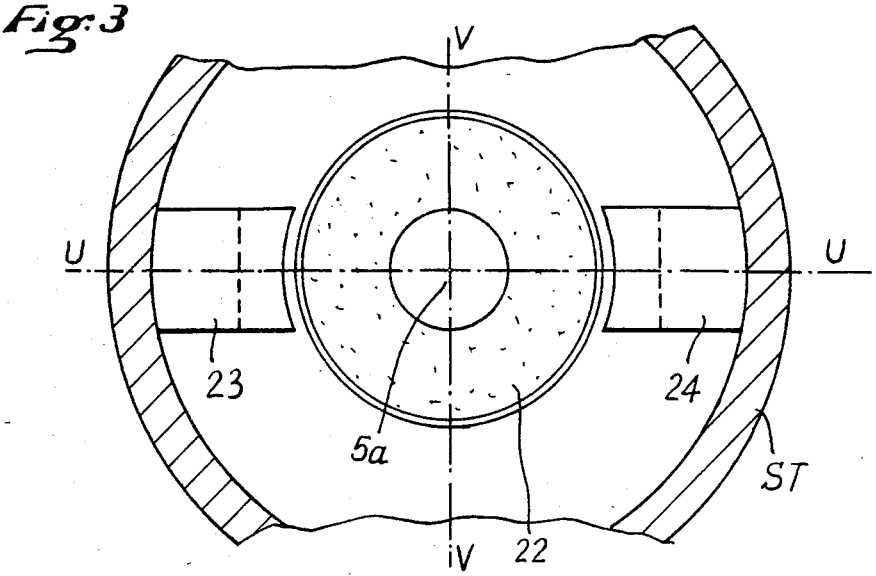
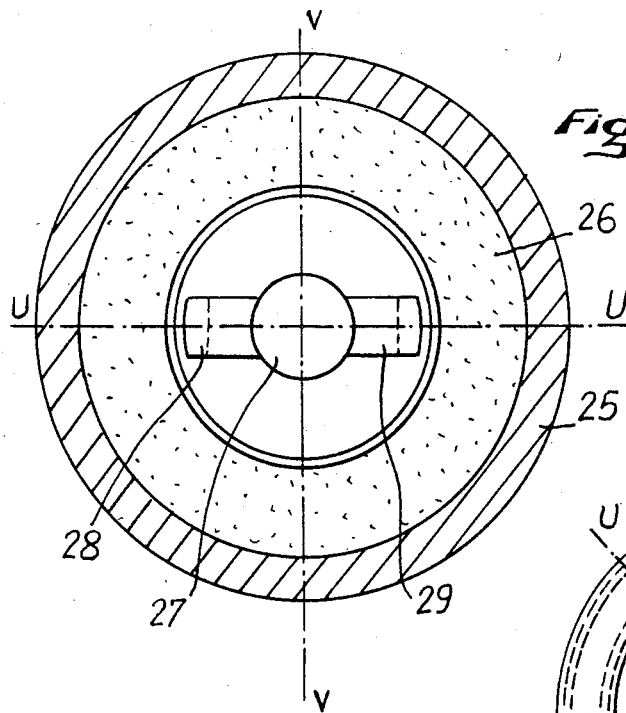
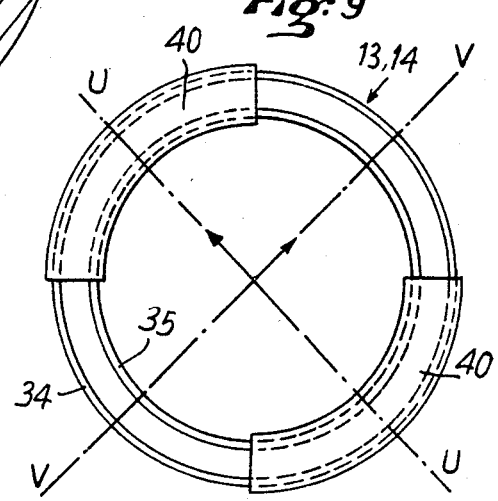

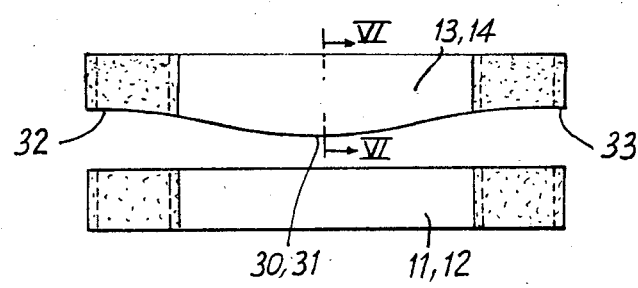
Fig: 5
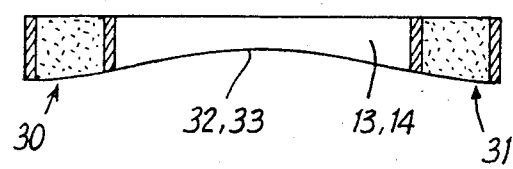
Fig: 6
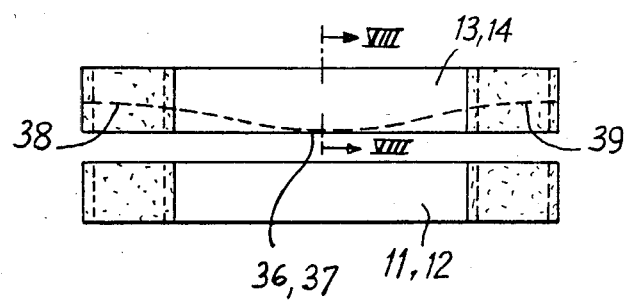
Fig: 7
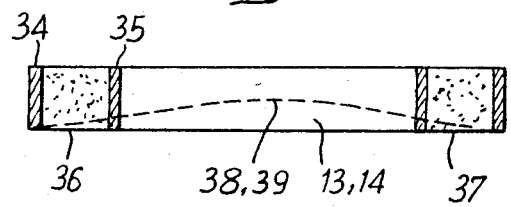
Fig: 8

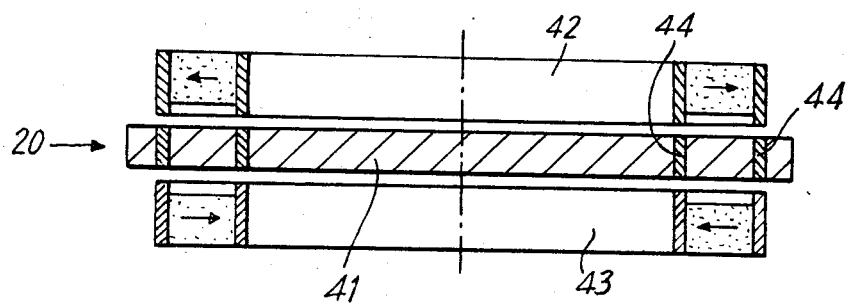
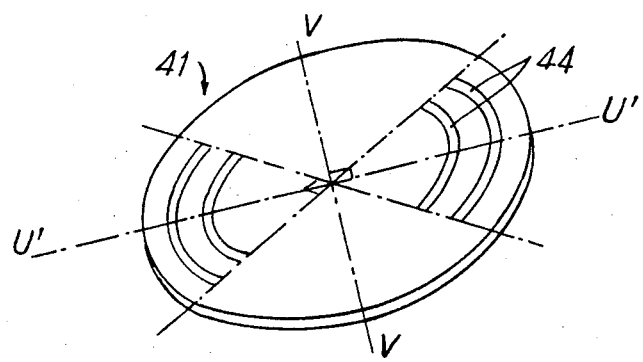
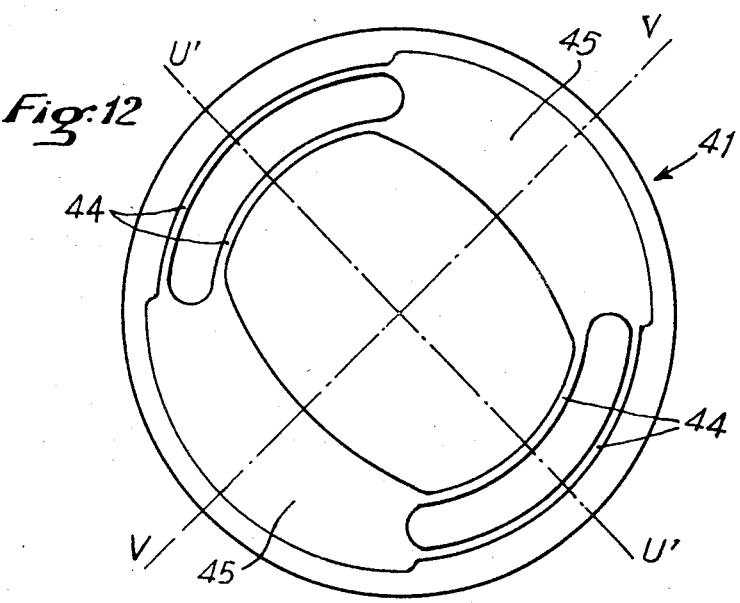

KINETIC WHEEL ARRANGEMENT INCORPORATING MAGNETIC BEARINGS, PARTICULARLY INTENDED TO SERVE AS ENERGY ACCUMULATOR

This application is a continuation of application Ser. No. 515,149, filed July 19, 1983, now abandoned.

The present invention relates to a kinetic wheel arrangement incorporating magnetic bearings, particularly for storing energy.

In French Pat. Nos. 74 00190, 74 40556, 77 07685 and 81 15831, Applicants have described various kinetic wheel arrangements incorporating magnetic bearings. These prior art arrangements may be used for controlling the attitude of artificial satellites and/or for storing energy either on board such satellites or on the ground.

It is an object of the present invention to provide such a kinetic wheel arrangement intended to serve as energy accumulator on the ground, i.e. comprising a rotor, comprising a flywheel and suspended magnetically with respect to a stator, which accumulates energy in kinetic form when it is driven in rotation by an electric motor and which restores the kinetic energy thus stored in electric form via an electricity generator, said motor and generator possibly being constituted by the same reversible type machine. Operation of such an arrangement advantageously implies that the rotor is in a vacuum, with the result that the stator and rotor are generally contained in an enclosure in vacuo.

With the kinetic wheel arrangements of this type, it is obvious that the kinetic energy stored is greater as the mass and rotation of the flywheel of the rotor are greater. Thus, with a view to using the kinetic wheel arrangements as energy accumulators, it is indispensable to give high values to the mass and speed of rotation of the rotor thereof. Now, although, for arrangements of relatively modest dimensions, the rotation of the rotor does not lead to any difficulty in stability. Applicants have observed that, for large-sized arrangements, phenomena of instability with radial divergence appeared, such phenomena being capable of preventing the arrangements from operating.

To overcome the radial instability of the rotor of such arrangements, active correction means of the type such as described, for a different purpose, in French Pat. No. 81 15831 mentioned above might be used. However, such correction means employ speed sensors and an electronic chain which increase the complexity, cost and mass of the kinetic wheel arrangement and reduce the reliability thereof.

It is therefore an object of the present invention to provide a kinetic wheel arrangement incorporating magnetic bearings, comprising passive means for automatically correcting the phenomena of radial instability of the rotor.

To this end, according to the invention, the kinetic wheel arrangement comprising a stator and a rotor, magnetic bearings formed by cooperating parts respectively connected to the stator and to the rotor to magnetically suspend the rotor with respect to the stator, mechanical bearings to allow the stator to support the rotor when the latter is not magnetically suspended, an inertia flywheel constituting part of the rotor and means for monitoring along the axis of rotation defined by the stator, the position of the rotor with respect to the stator, is noteworthy in that it comprises a magnetic system giving the radial rigidity of the rotor with respect to the stator, in at least one fixed radial direction, a value different from that presented by said radial rigidity in the other radial directions.

Thanks to the invention, a radial dissymmetry of rigidity is thus introduced, with the result that the vibrations capable of appearing along the fixed radial direction and along a radial direction at right angles thereto, are uncoupled.

In an attempt to explain the action of the magnetic system according to the invention, it should be recalled that the magnetic bearings are constituted by opposite magnetic rings, exerting on one another an action of self-alignment of their axes and communicating to the rotor its radial rigidity with respect to the stator. Thus, if the ring connected to the rotor is accidentally offset with respect to the ring of the stator, the rotor undergoes a radial return force. The instability with radial divergence can therefore be understood only if phenomena generating a radial parasitic force added to the radial return force of the bearings and of comparable intensity are caused to intervene.

As will be seen hereinafter. Applicants think that, further to magnetic losses, a disturbing force appears, applied to the axis of the rotor and at right angles to the line of shortest distance (offset) joining the axis of the stator to the offset axis of the rotor. Applicants therefore suppose that the rotor is subjected to a first vibratory mode of direction parallel to this disturbing force and to a second vibratory mode of direction parallel to the offset. These two vibratory modes each present their resonance peak at the same frequency and the divergent instability would result from the conjunction of the two resonances.

Consequently, since according to the invention these two vibratory modes are uncoupled, the conjunction of the two resonances and therefore the appearance of the phenomenon of divergent instability may be avoided.

The only purpose of the above explanations is to attempt to explain the manner in which the magnetic system according to the invention acts and they in no way limit the invention. Whether these explanations are correct or, on the contrary, inexact or incomplete, the conclusions to be drawn therefrom are in any case exact, since experience has shown that the suspension system according to the invention enables the phenomenon of divergent instability to be eliminated.

The positive results obtained by carrying out the present invention indicate that the divergent instability, appearing when the return force of the magnetic bearings presents a symmetry of revolution about the axis of said bearings, is not produced when, due to the presence of the suspension system according to the invention, this return force is rendered variable about said axis to take different values along two orthogonal radial axes.

The magnetic system according to the invention may be added in the form of an independent unit to the conventional structure of a kinetic wheel arrangement, or, on the contrary, it may modify or be incorporated in already existing magnetic elements of such an arrangement, such as the magnetic bearings or passive dampers of the movement of the rotor with respect to the stator.

This magnetic system may modify the radial rigidity of the rotor with respect to the stator in one fixed radial direction, this radial rigidity having an unchanged value for all the other radial directions.

On the contrary, the magnetic system may impose on the radial rigidity of the rotor a variation about the axis of rotation thereof, so that said rigidity takes a maximum value and a minimum value in two different radial directions.

The action of the magnetic system according to the invention may be translated both by an increase and by a decrease in the rigidity, in at least said fixed radial direction.

In an advantageous embodiment, there are provided, on the one hand, a ring of magnetic material, preferably a mild ferrite, connected to the rotor (or to the stator) and, on the other hand, two permanent magnets connected to the stator (or to the rotor) and disposed on the same diameter of said ring, symmetrically with respect to the axis of rotation of the rotor, so as to form air gaps with said ring.

In a variant, it may be arranged for the annular part of at least one magnetic bearing connected to the stator, to be provided to generate an induction of which the amplitude passes through a maximum at two diametrically opposite points of said magnetic bearing part and through a minimum at two other diametrically opposite points thereof, the points of maximum induction being located on a radial direction distinct from that on which the points of minimum induction are located.

In the event of the kinetic wheel arrangement comprising, in known manner, a damper of the movement of the rotor with respect to the stator, provided with an electrically conductive disc connected to the stator and disposed between two magnetized rings connected to the rotor, said disc may comprise, in two opposite quadrants, magnetic means adapted to cooperate with said magnetized rings.

The invention will be more readily understood on reading the following description with reference to the accompanying drawings, in which:

FIG. 3 is an enlarged section along line III—III of FIG. 1.

FIG. 4 illustrates a variant embodiment, along a section comparable to that of FIG. 3.

FIG. 5 shows a magnetic bearing structure for carrying out the present invention.

FIG. 6 is a section along line VI—VI of FIG. 5.

FIG. 7 illustrates a variant embodiment of magnetic bearing structure for carrying out the invention.

FIG. 8 is a section along line VIII—VIII of FIG. 7.

FIG. 9 shows another variant embodiment of magnetic bearing structure for carrying out the invention.

FIG. 10 shows a passive damper structure for carrying out the present invention.

FIGS. 11 and 12 illustrate the structure of stator discs for the damper of FIG. 10.

In these Figures, identical references denote like elements.

Figure 1:
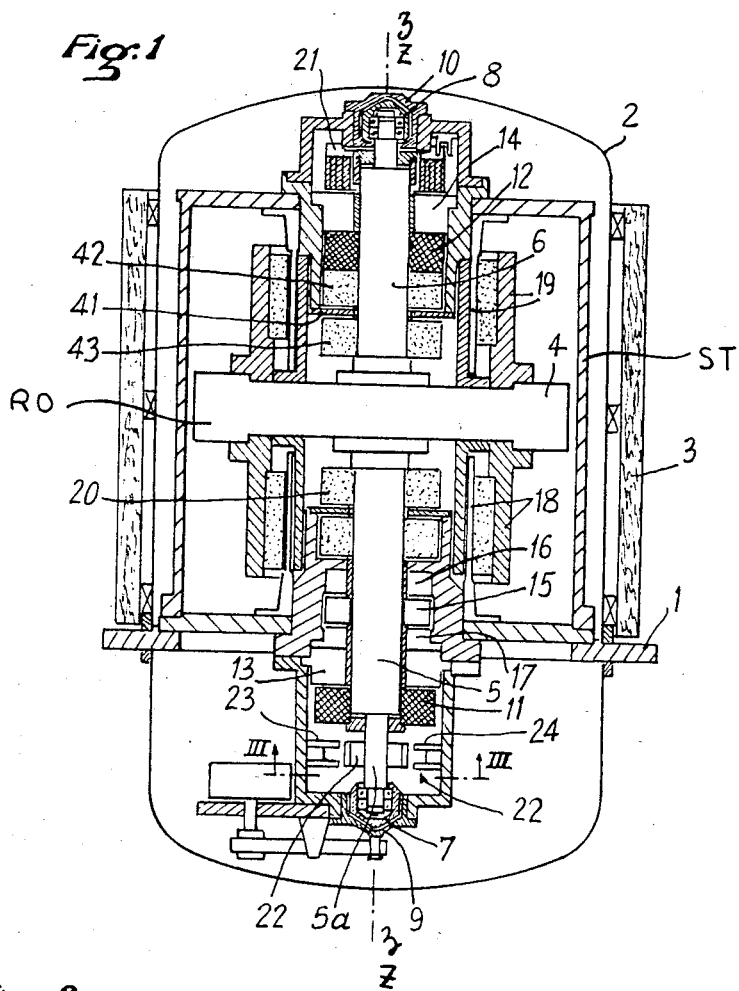
FIG. 1 is a view in axial section of an embodiment of the kinetic wheel incorporating magnetic bearings, according to the invention.

Referring now to the drawings, the embodiment of the kinetic wheel arrangement incorporating magnetic bearings, according to the invention and shown in FIG. 1, comprises a horizontal base plate 1 with which all the fixed elements of the stator ST of said wheel are directly or indirectly fast, and with respect to which the rotor RO of said wheel rotates.

In the embodiment shown, the axis of rotation Z—Z of the rotor RO is vertical. Said rotor and stator are enclosed in a tight envelope 2 in which a vacuum sufficient for correct operation of the kinetic wheel may be created, the envelope 2 being supported by the base plate 1. Furthermore, a cylindrical screen 3, laterally enveloping the envelope 2 and adapted to protect the environment against possible explosion of the rotor is provided outside the envelope 2, in the event of persons being present in the vicinity. In the hypothesis of use in space, the tight envelope 2 and the screen 3 may be eliminated.

The structure of the kinetic wheel of FIG. 1, which is for a large part known, will not be described in detail, but only insofar as this structure is necessary for understanding the present invention.

The rotor RO of the kinetic wheel comprises an inertia flywheel 4, substantially in disc form, fast with a lower shaft 5 and an upper shaft 6, which are coaxial (axis z—z) and at right angles to the plane of said flywheel. At the free ends of shafts 5 and 6 are provided stop systems 7 and 8 incorporating mechanical roller bearings, adapted to cooperate with corresponding fixed parts 9 and 10 of the stator, to support the rotor in stop position and to serve as axial and radial deviation limiter.

Shafts 5 and 6 are each fast with a magnetic bearing ring 11 or 12, which cooperate respectively with rings 13 and 14 of the stator, to form magnetic bearings 11-13 and 12-14.

The kinetic wheel further comprises an actuator for adjusting the axial position of the rotor with respect to the stator. This actuator comprises an annular part 15 fast in rotation with the shaft 5 (or 6) and two fixed annular parts 16 and 17, disposed on either side of the annular part 15.

In addition, the kinetic wheel of FIG. 1 comprises a drive assembly 18 for driving the rotor in rotation and a generator assembly 19 for restoring in electric form the energy of rotation stored by said rotor. Of course, the drive assembly 18 and the generator assembly 19 may possibly be constituted by a single reversible electric machine.

Experience has shown that, for relatively light rotors, for example of which the mass of the flywheel 4 is less than a few kilograms, no phenomenon of instability capable of influencing the axis of said rotor appears, this virtually whatever the speed of the rotor within its speed range (for example from 0 to 15,000 rpm). In this case, during rotation of the rotor, the axis z—z thereof is constantly merged with axis Z—Z of rotation defined by the bearings of the stator.

On the other hand, when the speed of rotation of the rotor RO becomes high (for example $\geq 20000$ rpm) and/or when the mass of the flywheel 4 becomes equal to a few tens or hundreds of kilograms, particularly with a view to using the kinetic wheel as kinetic energy accumulator, the appearance of such a phenomenon of instability affecting the axis of said rotor RO is observed.

This unstable behaviour appears only beyond a limited speed of rotation which, however, is generally much less than the maximum speed provided for the rotor.

For example, instability appears at 1500 rpm for a rotor of which the maximum speed is 12,000 rpm and of which the mass of the flywheel 4 is 200 kg.

The phenomenon of instability is characterized in that the axis of rotation z—z of the rotor, whilst remaining parallel to the magnetic axis Z—Z defined by the bearings of the stator, moves away from this axis Z—Z describing a divergent spiral, up to contact of the stop systems 7 and 8 of the rotor with the corresponding fixed parts 9 and 10 of the stator.

It has been observed that:

the frequency at which axis z—z describes the spiral is close or equal to the frequency at which the rotor oscillates when it is moved away radially from its position of equilibrium;

the radial divergence of the rotor is all the more rapid as the speed of rotation thereof is high;

the divergent spiral movement of axis z—z of the rotor is established in the same direction as the rotation of said rotor.

Applicants believe that the explanation of this phenomenon of instability may be found, without this limiting the invention, in the action of magnetic losses (or even aerodynamic losses if the vacuum inside the envelope 2 is not sufficiently good) generated by the relative movement of magnetized pieces and electrically conductive pieces. In particular, whatever care is taken in the manufacture and relative positioning of the magnetic rings 11-13, 12-14 and 15-16-17, certain defects in radial magnetic homogeneity cannot be prevented, which bring about electromagnetic losses, themselves giving rise to disturbing forces which provoke the spiral divergence of the rotor. According to this hypothesis, the rotor would thus diverge under the action of a force of electromagnetic origin developing in particular in the magnetic bearings 11-13 and 12-14 and in the actuator 15-16-17.

As far as it can be assumed and observed, the characteristics of this disturbing force would be:

its amplitude $F_p$ is proportional to the speed of rotation $\Omega$ of the rotor and to the offset e of the rotor, i.e. to the distance separating the axis z—z from axis z—z; $F_p = \lambda \Omega e$ may thus be written.

The factor of proportionality $\lambda$ is variable from one kinetic wheel model to the other and depends on the mechanical clearances, on the verticality of axis Z—Z, but is a characteristic of the corresponding kinetic wheel.

its direction is orthogonal to that of the offset of the rotor with respect to the stator;

its direction is determined by the direction of rotation of the rotor.

Figure 2:
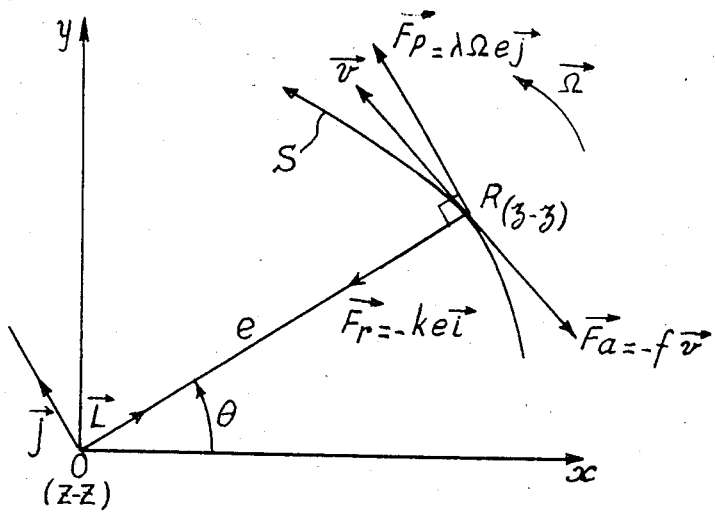
FIG. 2 is a diagram illustrating the phenomenon of instability affecting the axis of the rotor of the kinetic wheel of FIG. 1, under certain conditions of mass and speed of rotation of said rotor.

FIG. 2 shows a system of rectangular axes ox, oy, of which the origin O is located on axis Z—Z, the plane xoy being orthogonal to axis Z—Z. At a given instant, axis z—z of the rotor is offset from axis Z—Z by the quantity e and is located at R in the portion of spiral S, which it covers at velocity v. This axis z—z is subjected to the action of the disturbing force $\vec{F_p}$ which is opposed by the damping force $\vec{F_a}$ of the rotation of the rotor. The force $\vec{F_p}$ is, as mentioned above, orthogonal to OR and in the same direction as $\vec{\Omega}$. The force $\vec{F_a}$ is colinear to the velocity vector $\vec{v}$, but of opposite direction. Moreover, axis x—x is subjected to the action of the return force $\vec{F_r}$ exerted by the magnetic bearings 11-13 and 12-14 and of which the amplitude is proportional to the offset e.

By calling $\theta$ the angle between the vectors $\vec{Ox}$ and $\vec{OR}$, $\vec{i}$, the director vector of $\vec{OR}$ and $\vec{j}$, the director vector of $\vec{F_p}$, the following may be written:

$$\vec{F_p} = \lambda \Omega e \vec{j}$$

$$\vec{F_a} = -f \vec{v},$$

f being constant and corresponding to the coefficient of friction applied to the rotor, $$\vec{F_r} = -k e \vec{i},$$

k being constant and indicative of the radial rigidity of the magnetic bearings.

From this system of forces, the equations of the movement of the rotor may be written, employing the mass m of the rotor, said equations being:

$$m\ddot{x} = k e \cos(\theta + \pi) + \lambda\Omega e \cos\left(\theta + \frac{\pi}{2}\right) - f\dot{x}$$

$$m\ddot{y} = k e \sin(\theta + \pi) + \lambda\Omega e \sin\left(\theta + \frac{\pi}{2}\right) - f\dot{y}$$

i.e.

$$m\ddot{x} = -k e \cos\theta - \lambda\Omega e \sin\theta - f\dot{x}$$

$$m\ddot{y} = -k e \sin\theta + \lambda\Omega e \cos\theta - f\dot{y}.$$

Taking into account the fact that $x = e \cos\theta$ and $y = e \sin\theta$, the following system is obtained:

$$m\ddot{x} + f\dot{x} + k x = -\lambda\Omega y$$

$$m\ddot{y} + f\dot{y} + k y = \lambda\Omega x.$$

The resolution of this system of differential equations, with application of the ROUTH criterion, shows that the rotation of the rotor is stable if:

$$f > \frac{\lambda\Omega}{\omega_T} \text{ with } \omega_T = \sqrt{\frac{k}{m}} \quad (1)$$

Inequality (1) shows that, for a given kinetic wheel (i.e. for a determined value of $\lambda$), the stability of rotation of the rotor at a given speed $\Omega$ can be ensured only by increasing the parameter f and/or the parameter $\omega_T$.

Increasing the parameter f consists in equipping the kinetic wheel with an active or passive radial damper. Such a damper must generally multiply the natural damping by at least 10 to obtain stability. This results in that, in its passive form, i.e. constituted by permanent magnets, such a damper requires many magnets and is therefore voluminous. Experimental trials have shown an improvement consecutive to the implantation of such a passive damper; however, this improvement is obtained to the detriment of the mass of the whole and, moreover, due to the manufacturing dispersions, the passive damper must be adjusted for each of the kinetic wheels.

As the case may be, two passive dampers 20 have been provided in FIG. 1, constituted by a copper disc 41 connected to the stator and associated with two magnetic rings 42 and 43 fast with the rotor. An active damper may also be provided, associated with a sensor 21 and generating a damping force as a function of the measurement of the radial velocity of the rotor given by the sensor 21. Such an active damper, described in French Pat. No. 81 15831 mentioned above, is entirely satisfactory. However, it presents the drawback of requiring at least one servo control system increasing the cost of the kinetic wheel. Moreover, in the event of breakdown of said servo system, the spiral divergence of the rotor is no longer controlled.

It will be noted that the criterion $\omega_T$ corresponds to the pulsation of radial translation. If it is envisaged (as indicated above) to increase this pulsation by a factor of 10, the ratio k/m, i.e. the radial rigidity k, must be multiplied by 100, which is unacceptable. Furthermore, the increase in the rigidity of the bearings, i.e. in their efficiency, would be translated by an increase in the tendency of the rotating rotor to diverge, since the losses by eddy currents would increase in the magnetic bearings.

Consequently, the main object of the invention is to solve the problem of the spiral divergence of the rotor by a channel other than the two possibilities described above.

To this end, according to the invention, a system is provided for giving the radial rigidity of the rotor with respect to the stator a characteristic of anisotropy, this rigidity having a different value in at least one direction. A differential rigidity is then created at the level of the magnetic fields participating in radial centering.

In the embodiment of this system shown in FIGS. 1 and 3, a ferrite ring 22 has been mounted on the small-diameter extension 5a connecting the shaft 5 to the stop system 7-9 with bearings, so that said ring 22 is concentric and fast in rotation with rotor RO. Furthermore, two diametrically opposite permanent magnets 23 and 24 have been connected to stator ST at the level of the ferrite ring 22, so that the flux of said magnets closes through said ring 22. A negative rigidity evading the rigidity of the bearings 11-13 and 12-14 is thus created along axis U—U on which the magnets 23 and 24 are disposed.

This modification of rigidity along the radial axis U—U makes it possible to decouple the vibratory phenomena appearing parallel to said axis U—U and to axis V—V orthogonal and coplanar with respect to U—U, so that the appearance of the divergent instability is eliminated.

Of course, if instead of reducing the radial rigidity along axis U—U, it were increased, the same advantageous result would be obtained.

In order to minimize the magnetic losses in rotation, it is advantageous to use, for ring 22, ferrites or sheet metal with low losses. Moreover, in this respect, it is interesting to give the ring 12 the smallest possible diameter: this is why this ring is mounted on the extension 5a rather than on the shaft 5 itself.

In FIGS. 1 to 3, the shaft of the rotor RO is solid. In certain cases, as indicated in the prior art Patents mentioned above, the shaft of the rotor may be hollow and, in that case, a fixed shaft passes therethrough. FIG. 4 shows such a structure, in section equivalent to that of FIG. 3, improved according to the invention. In the hollow shaft 25 of the rotor, a ferrite ring 6 has been fixed so that the latter is fast in rotation with said rotor. Moreover, on the inner fixed shaft 27, two diametrically opposite magnets 28 and 29 have been fixed. As before, the magnets 28 and 29 determine an axis U—U of reduced rigidity and an axis V—V, at right angles thereto, of normal rigidity.

To carry out the present invention, one may also act directly on the magnetic bearings, as shown in FIGS. 5 to 8.

In the embodiment of FIGS. 5 and 6, the rings 13 and 14 of the bearings, connected to stator ST, have been sectioned so that these rings present two diametrically opposite zones 30 and 31 of large thickness and two diametrically opposite zones 32 and 33 of small thickness. Rings 11 and 12 of the bearings connected to the rotor remain of revolution.

In this way, the induction opposite zones 32 and 33 is less than opposite zones 30 and 31, this resulting in an alternating distribution of the induction in the air gap, which gives the desired characteristic of rigidity to the couples of bearings. Thanks to this configuration, a direction in which the radial rigidity is maximum is thus determined, the direction at right angles thereto being the seat of a minimum rigidity.

In the embodiment of FIGS. 7 and 8, a similar effect is obtained, not by alternately modifying the section of parts 13 and 14 of the stator, but by acting on the height of the magnets between two rings 34 and 35 defining said parts. In this way, two diametrically opposite zones 36 and 37 of high induction and two zones 38 and 39 of low induction are obtained.

In a variant, in the device of FIG. 9, magnetic shunts 40 have been provided, disposed on two opposite quadrants of the rings 13 and 14, constituting the parts of the magnetic bearings connected to the stator ST. It will be understood that an axis U—U of low radial rigidity and an axis V—V at right angles thereto of unchanged radial rigidity, is thus obtained in similar fashion for the magnetic bearings.

FIG. 10 shows an embodiment of the present invention employing the or each passive damper 20 mentioned above. These dampers, of known type, comprise a copper disc 41 (connected to the stator) disposed between two magnetized rings 42 and 43 (connected to the rotor). The device 41 is the seat of eddy currents, which are at the origin of the desired damping.

As may be seen in FIGS. 10 and 11, in two opposite quadrants, magnetic inlays 44 have been provided, adapted to cooperate with the magnetized rings 42 and 43. In this way, an axis U'—U' of reinforced radial rigidity (passing through the bisectrix of the quadrants comprising the magnetic inlays 44) and an axis V—V of unchanged radial rigidity (at right angles to axis U'—U') are obtained.

In the embodiment of the disc 41 shown in FIG. 12, the magnetic inlays 44 are connected to one another by wide magnetic zones 45 disposed in the other two quadrants, so that an axis V—V of lower radial rigidity (passing through the bisectrix of the quadrants containing the zones 45) and an axis V'—V' of greater radial rigidity (passing through the bisectrix of the quadrants containing the inlays 44) are obtained. The purpose of this variant is to reduce the electromagnetic losses which may possibly develop in the piece shown in FIG. 11.

What is claimed is:

1. A kinetic wheel arrangement, comprising:
   a stator,
   a rotor,
   magnetic bearings formed by cooperating annular parts respectively connected to the stator and to the rotor to magnetically suspend the rotor with respect to the stator,
   mechanical bearings to enable the stator to support the rotor when the latter is not suspended magnetically,
   an inertia flywheel constituting a part of the rotor, and
   a magnetic system having at least one electrically conductive disc connected to the stator and disposed between two magnetized rings connected to the rotor, said electrically conductive disc having in two opposite quadrants magnetic inlays, said magnetic inlays are connected to one another by wide magnetic zones disposed in the other two opposite quadrants, whereby said magnetic system imparts a radial rigidity of the rotor with respect to the stator in first one predetermined radial direction a value different from that presented by said radial rigidity in other radial directions such that a radial dissymmetry of rigidity is introduced and vibrations capable of appearing along said first predetermined radial direction and another radial direction are uncoupled.

2. The kinetic wheel arrangement as claimed in claim 1 wherein the magnetic system is added in the form of an independent unit.

3. The kinetic wheel arrangement as claimed in claim 1 wherein the magnetic system modifies the magnetic elements of said arrangement.

4. The kinetic wheel arrangement as claimed in claim 1 wherein the magnetic system modifies the radial rigidity of the rotor, with respect to the stator, in one single fixed radial direction U—U, said radial rigidity having an equal value for all the other radial directions.

5. The kinetic wheel arrangement as claimed in claim 1 wherein the magnetic system imposes on the radial rigidity of the rotor a variation about the axis of rotation thereof, so that said rigidity takes a maximum value and a minimum value in two different radial directions.

6. The kinetic wheel arrangement as claimed in claim 5 wherein the annular part at least of a magnetic bearing connected to the stator is provided to generate an induction of which the amplitude passes through a maximum at two diametrically opposite points of said magnetic bearing part and through a minimum at two other diametrically opposite points thereof, the points of maximum induction being located on a radial direction different from that on which the points of minimum induction are located.

7. The kinetic wheel arrangement as claimed in claim 1 wherein said magnetic system increases the rigidity of the rotor, in at least said fixed radial direction.

8. The kinetic wheel arrangement as claimed in claim 1 wherein said magnetic system reduces the rigidity of the rotor, in at least said fixed radial direction.

9. The kinetic wheel arrangement as claimed in claim 8 wherein said arrangement comprises, on the one hand, a ring of magnetic material connected to the rotor and, on the other hand, two permanent magnets connected to the stator and disposed on the same diameter U—U of said ring, symmetrically with respect to the axis of rotation Z—Z of the rotor, so as to form air gaps with said ring.

10. The kinetic wheel arrangement as claimed in claim 8 wherein said arrangement comprises, on the one hand, a ring of magnetic material connected to the stator and, on the other hand, two permanent magnets connected to the rotor and disposed on the same diameter U—U of said ring, symmetrically with respect to the axis of rotation Z—Z of the rotor, so as to form air gaps with said ring.

* * * * *